United States Patent
Mizuno et al.

(10) Patent No.: US 10,069,138 B2
(45) Date of Patent: *Sep. 4, 2018

(54) VANADIUM OXYSULFIDE BASED CATHODE MATERIALS FOR RECHARGEABLE BATTERY

(71) Applicant: Toyota Motor Engineering & Manufacturing North America, Inc., Erlanger, KY (US)

(72) Inventors: Fuminori Mizuno, Ann Arbor, MI (US); Timothy S. Arthur, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 450 days.

This patent is subject to a terminal disclaimer.

(21) Appl. No.: 14/693,235

(22) Filed: Apr. 22, 2015

(65) Prior Publication Data

US 2015/0311506 A1 Oct. 29, 2015

Related U.S. Application Data

(63) Continuation-in-part of application No. 14/260,544, filed on Apr. 24, 2014, now Pat. No. 9,711,793.

(51) Int. Cl.
*H01M 4/13* (2010.01)
*H01M 4/36* (2006.01)
(Continued)

(52) U.S. Cl.
CPC ............ *H01M 4/364* (2013.01); *H01M 4/13* (2013.01); *H01M 4/48* (2013.01); *H01M 4/5815* (2013.01);
(Continued)

(58) Field of Classification Search
CPC .... H01M 4/364; H01M 4/483; H01M 4/5815; H01M 10/054
(Continued)

(56) References Cited

U.S. PATENT DOCUMENTS 4,934,922 A  6/1990 Abraham et al.
5,366,830 A * 11/1994 Koksbang ............. H01M 4/485
205/50

(Continued)

OTHER PUBLICATIONS

E. Levi, et al., "On the Way to Rechargeable Mg Batteries: The Challenge of New Cathode Materials" Chem. Mater., vol. 22, No. 3 (2010) (pp. 860-868).
(Continued)

*Primary Examiner* — Sean P Cullen
(74) *Attorney, Agent, or Firm* — Oblon, McClelland, Maier & Neustadt, L.L.P.

(57) ABSTRACT

A cathode active composite containing an amorphous composite of vanadium oxide and an inorganic sulfide is provided. In one embodiment the composite contains vanadium pentoxide and phosphorous pentasulfide. In a further special embodiment, a cathode active material comprising a nanoparticle composite of an amorphous matrix containing vanadium, oxygen and sulfur and crystalline regions of vanadium and oxygen embedded in the matrix is provided. Electrochemical cells and a reversible battery having a cathode containing one of the cathode active composites are also provided. In specific embodiments the battery is a magnesium battery.

5 Claims, 8 Drawing Sheets (51) Int. Cl.
*H01M 4/48* (2010.01)
*H01M 4/58* (2010.01)
*H01M 10/0525* (2010.01)
*H01M 10/054* (2010.01)
*H01M 4/02* (2006.01)

(52) U.S. Cl.
CPC ..... *H01M 10/054* (2013.01); *H01M 10/0525* (2013.01); *H01M 2004/028* (2013.01)

(58) Field of Classification Search
USPC .......................... 429/231.2, 231.5; 252/182.1
See application file for complete search history.

(56) References Cited

U.S. PATENT DOCUMENTS

| | | | |
|---|---|---|---|
| 5,919,587 A | 7/1999 | Mukherjee et al. | |
| 6,916,579 B2 | 7/2005 | Gorchkov et al. | |
| 7,695,531 B2 | 4/2010 | Gaillard et al. | |
| 2009/0325065 A1* | 12/2009 | Fujii | H01M 4/04 429/199 |
| 2012/0015220 A1* | 1/2012 | Kawaoka | H01M 10/052 429/90 |
| 2012/0064409 A1 | 3/2012 | Zhamu et al. | |
| 2012/0070588 A1 | 3/2012 | Bedjaoui et al. | |
| 2012/0164537 A1 | 6/2012 | Aoyagi et al. | |
| 2012/0219856 A1 | 8/2012 | Doe et al. | |
| 2013/0171502 A1 | 7/2013 | Chen et al. | |

OTHER PUBLICATIONS

G. G. Amatucci, et al., "Investigation of Yttrium and Polyvalent Ion Intercalation into Nanocrystalline Vanadium Oxide" Journal of the Electrochemical Society, 148 (8) A940-A950 (2001).

Daichi Imamura, et al., "Mg Intercalation Properties into $V_2O_5$ gel/Carbon Composites under High-Rate Condition" Journal of the Electrochemical Society, 150 (6) A753-A758 (2003).

Daichi Imamura, Masaru Miyayama, "Characterization of magnesium-intercalated $V_2O_5$/carbon composites", Solid State Ionics 161:173-180 (2003).

G. Ouvrard, et al., "Structural, physical and Electrochemical Characteristics of a Vanadium Oxysulfide, a Cathode Material for Lithium Batteries" Journal of Power Sources, 54 (1995) 246-249.

* cited by examiner

VANADIUM OXYSULFIDE BASED CATHODE MATERIALS FOR RECHARGEABLE BATTERY

CROSS REFERENCE TO RELATED APPLICATIONS

This application is a continuation in part of U.S. application Ser. No. 14/260,544, filed Apr. 24, 2014, the content of which is incorporated herein by reference in its entirety.

BACKGROUND OF THE INVENTION

The present invention is directed to a positive electrode active material for a magnesium secondary battery and a magnesium battery with a cathode based on the active material.

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/eq and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Production of a battery having an anode based on magnesium requires a cathode which can reversibly adsorb and desorb magnesium ions and an electrolyte system which will efficiently transport magnesium ions. Significant effort in each of these areas is ongoing in many research organizations throughout the world and active materials under investigation include sulfur in various forms, including elemental sulfur, materials known as Chevrel compounds of formula $Mg_xMo_6T_n$, (wherein x is a number from 0 to 4, T is sulfur, selenium or tellurium, and n is 8) and various metal oxides such as $MnO_2$ (alpha manganese dioxide stabilized by potassium), $V_2O_5$ and ion stabilized oxide or hollandiates of manganese, titanium or vanadium.

In this regard, cathodic active materials based on vanadium, such as $V_2O_5$ are extremely promising candidates for the Mg battery cathode, because vanadium is capable of multiple redox reactions between $V^{5+}/V^{4+}/V^{3+}$ and V metal. Also, $V^{5+}$ as a high valence state is quite stable, which means that it is easy to increase the operating voltage. Various research groups have reported efforts directed to utility of $V_2O_5$ as a positive electrode active material.

However, vanadium oxide suffers as an active material for insertion and deinsertion of magnesium ions because of the strong attraction of the $Mg^{2+}$ ion for oxygen of the $V_2O_5$. This attraction leads to sluggish magnesium ion diffusion and hinders further magnesiation. Thus, low capacity and low rates are obtained with $V_2O_5$ without further modification.

Nanocrystalline $V_2O_5$ provides improved performance, however, it is conventionally known that nanocrystalline materials have low packing density and it is difficult to prepare a cathode having a desired high capacity and yet have sufficiently small dimensions to be useful in small scale appliance utility. Thus, the volumetric energy density of a cell employing nanocrystalline $V_2O_5$ would not be acceptable for commercial applications. Moreover, nanocrystalline materials promote electrolyte decomposition due to an extremely high surface area of the nanoparticles.

In an ongoing study of cathode active materials of high energy density for utility in a magnesium battery the present inventors have studied methods to mitigate the strong force of attraction of the magnesium ion for $V_2O_5$. Substitution of sulfur for oxygen in the active material in the form of an oxysulfide compound has been investigated.

Chen et al (U.S. 2013/0171502) describe a hybrid electrode assembly having a central current collector and on one side of the collector, a layer of a lithium ion intercalation material and on the other side a layer of an intercalation-free material such as a graphene. Conventional Li intercalation materials are listed in paragraphs [0072], [0104] and in claim 12. Included in the list are $V_2O_5$, $V_3O_8$, sulfur compounds and any mixture thereof.

Bedjaoui et al. (U.S. 2012/0070588) describe a method to package a lithium microbattery. In general description of a microbattery, titanium oxysulfide is described as a cathode active material.

Zhamu et al. (U.S. 2012/0064409) describes a lithium ion battery having electrodes containing nano-graphene-enhanced particulate materials. Conventional cathode active materials described include lithium vanadium oxide, doped lithium vanadium oxide, metal sulfides and combinations thereof. Explicit disclosure of a mixture of vanadium pentoxide and a sulfide glass forming agent is not made, nor is such a material suggested.

Gaillard et al. (U.S. Pat. No. 7,695,531) describe a photolithographic method to produce an electrolyte thin film for a lithium microbattery. In general description of a lithium microbattery components, titanium disulfide, titanium oxysulfide and vanadium oxide are listed as suitable cathode materials.

Gorchkov et al. (U.S. Pat. No. 6,916,579) describe cathode materials for a lithium ion or lithium metal battery which contains a crystalline vanadium oxide and a chalcogenide of sulfur, selenium or telurium. A mixture of vanadium pentoxide and a sulfide glass forming agent is not suggested.

Mukherjee et al. (U.S. Pat. No. 5,919,587) describe a composite cathode for an electrochemical cell which is constructed of an electroactive sulfur polymeric material and a transition metal chalcogenide. Other components such as silica, alumina and silicate may be present. Although, cells based on Group I and Group II metals are described generically, explicit disclosure of a magnesium electrochemical cell is not made. Vanadium pentoxide is disclosed as an example of the transition metal chalcogenide, however, a mixture of vanadium pentoxide and a sulfide glass forming agent is not made nor suggested. Phosphorous pentasulfide is not disclosed as a component of the cathode active material.

Abraham et al. (U.S. Pat. No. 4,934,922) describe a cathode active material being a transition metal oxysulfide, preferably molybdenum oxysulfide. Cells based on Group I and Group II metals are described generically, however, the focus is on lithium cells and explicit disclosure of a magnesium electrochemical cell is not made.

Ouvrard et al. (Journal of Power Sources, 54 (1995) 246-249) describes a vanadium oxysulfide compound of formula $V_2O_3S.3H_2O$ as an intercalation material for lithium ions. A lithium electrochemical cell having a positive electrode containing the vanadium oxysulfide is also described.

Aoyagi et al. (U.S. 2012/0164537) describes a positive electrode material for a magnesium battery. The cathodic material is a composite of vanadium oxide, phosphorous oxide, transition metal oxide and other elements such as alkali metals, sulfur and halogen. The composite is fused at specific temperatures and times to grow a mixed phase system containing vanadium oxide crystallites in an amorphous phosphorous oxide phase. In example I-28 a composition based on $V_2O_5$, $P_2O_5$, $Fe_2O_3$ and LiS is described. A mixture of vanadium pentoxide and phosphorous pentasulfide or any sulfide glass forming agent is not disclosed as a composition of a cathode active material.

Levi et al. (Chem. Mater. 2010, 22, 860-868) reviews the materials employed to date as positive electrode compositions and the problems associated with each. $V_2O_5$ aerogels are discussed; however, nowhere is a mixture of vanadium pentoxide and a sulfide glass forming agent disclosed or suggested.

Doe et al. (U.S. 2012/0219856) describe a series of spinel structure composites which serve as chalcogenides for a positive electrode for insertion and deinsertion of magnesium ion. Vanadyl phosphates are described among many others. However, this reference does not disclose or suggest a mixture of vanadium pentoxide and a sulfide glass forming agent.

Amatucci et al. (Journal of the Electrochemical Society, 148(8) A940-A950 (2001)) (listed in Invention Disclosure) describe a study of nanocrystalline $V_2O_5$ as an intercalation material for various cations. Although this reference indicates improvement in performance is necessary, disclosure or suggestion of mixture of vanadium pentoxide and a sulfide glass forming agent is not made.

Imamura et al. (Journal of the Electrochemical Society, 150(6) A753-A758 (2003)) report the synthesis and characterization of a $V_2O_5$ carbon composite as a positive electrode material for a magnesium battery, but does not disclose or suggest a mixture of vanadium pentoxide and a sulfide glass forming agent as a cathode active material.

Imamura et al. (Solid State Ionics, 161 (2003) 173-180) describes the performance of a $V_2O_5$ carbon composite as a positive electrode material for insertion and desertion of magnesium ion. Nowhere is a mixture of vanadium pentoxide and a sulfide glass forming agent disclosed or suggested.

None of the references cited disclose or suggest a mixture of vanadium pentoxide and a sulfide glass forming agent as a cathode active material for a magnesium battery.

Therefore, an object of the present invention is to provide a $V_2O_5$ based cathode active material which meets the requirements of a high energy magnesium battery and overcomes the deficiencies of the $V_2O_5$ forms conventionally known.

Another object of the present invention is to provide a positive electrode based on a modified $V_2O_5$ based material and a magnesium battery containing the positive electrode having significantly improved energy density and performance in comparison to known magnesium electrochemical devices.

SUMMARY OF THE INVENTION

These and other objects are addressed by the present invention, the first embodiment of which includes a cathode active material comprising a composite of vanadium oxide and an inorganic sulfide compound, wherein the structure of the composite is substantially amorphous and an X-ray diffraction (XRD) analysis does not show a crystalline peak.

In a further embodiment, the present invention includes a cathode active material, comprising: nanoparticles of a mechanically milled composite of a vanadium oxide source and an inorganic sulfide source, wherein the composite comprises regions of crystalline morphology embedded in an amorphous matrix.

In embodiments of the invention the vanadium oxide or vanadium oxide source comprises vanadium pentoxide ($V_2O_5$) or consists of $V_2O_5$.

In other embodiments the inorganic sulfide compound or inorganic sulfide source is at least one selected from the group consisting of $P_2S_5$, $B_2S_3$, $SiS_2$, $GeS_2$, $Al_2S_3$ and $Ga_2S_3$.

Cathodes containing the active materials according to the present invention are capable of insertion and release of lithium ions, sodium ions or magnesium ions.

In other embodiments the present invention includes electrochemical cells containing the cathode active materials according to the embodiments of the present invention.

In another embodiment, the present invention includes a reversible magnesium battery comprising: an anode; a cathode; and an electrolyte; wherein the cathode comprises: a current collector; and an active material comprising a composite of vanadium oxide and an inorganic sulfide compound, wherein the structure of the composite is substantially amorphous and an XRD analysis does not show a crystalline peak.

In another further embodiment, the present invention includes a reversible magnesium battery comprising: an anode; a cathode; and an electrolyte; wherein the cathode comprises: a current collector; and a cathode active material, comprising: nanoparticles of a mechanically milled composite of a vanadium oxide source and an inorganic sulfide source, wherein the composite comprises regions of crystalline morphology embedded in an amorphous matrix.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

The present inventors are conducting a wide scale study and evaluation of materials which may function as cathode active materials for a magnesium secondary battery. The object of this study is to discover cathode active materials which are readily available, safe and comparatively easy to handle in a production environment and which provide a magnesium battery having high capacity and high working potential.

Throughout this description all ranges described include all values and sub-ranges therein, unless otherwise specified. Additionally, the indefinite article "a" or "an" carries the meaning of "one or more" throughout the description, unless otherwise specified.

The inventors have discovered that amorphous compositions of vanadium oxide and an inorganic sulfide compound are capable of insertion and extraction of metal ions such as lithium, sodium and magnesium, preferably magnesium. When an amorphous composite according to one of the embodiments of the present invention is formulated into a cathode, a magnesium battery having high capacity and working potential may be obtained. Initial portions of this work were disclosed in U.S. application Ser. No. 14/260,544, filed Apr. 24, 2014, the disclosure of which is incorporated herein by reference.

Thus, in the first embodiment, the present invention provides a cathode active material, comprising: a composite of vanadium oxide and an inorganic sulfide compound, wherein the structure of the composite is substantially amorphous and an XRD analysis does not show a crystalline peak.

Upon continued study of the amorphous material obtained via mechanical milling methods, the inventors have discovered that under such treatment conditions a comminuted material containing nanoparticles which are a composite of regions of amorphous material and regions of crystallinity may be obtained.

Thus, in a further embodiment, the present invention provides a cathode active material, comprising: nanoparticles of a mechanically milled composite of a vanadium oxide source and an inorganic sulfide source, wherein the composite comprises regions of crystalline morphology embedded in an amorphous matrix.

Figure 5:
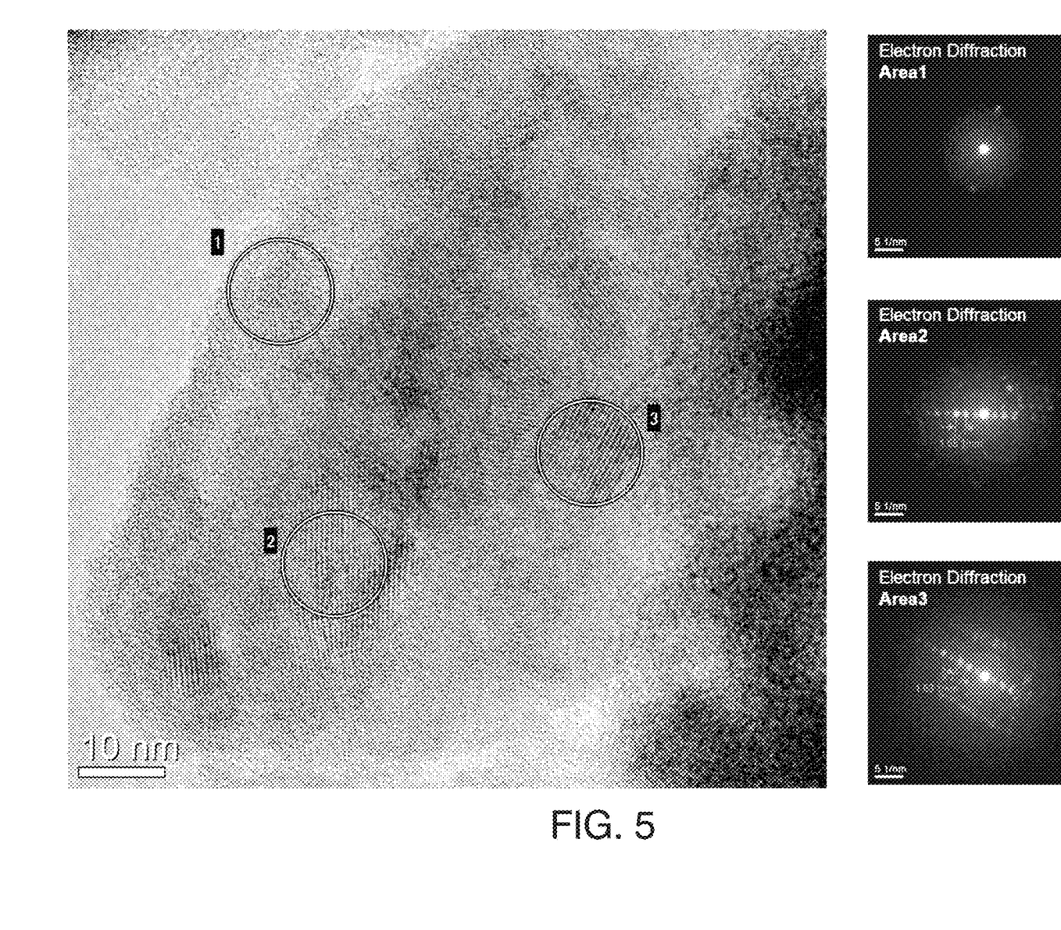
FIG. 5 shows a transmission electron microscopy (TEM) image of a nanoparticle composite according to an embodiment of the invention.

This nanoparticle morphology is shown in FIG. 5 where a composite nanoparticle having a major portion of its volume attributed to amorphous regions as exemplified by circular area 1, while within the nanoparticle, small regions of crystallinity as depicted in circular areas 2 and 3 are also present.

Surprisingly, EDX profiles of the crystalline regions show the presence of substantially only vanadium and oxygen while the major amorphous region which appears as a matrix containing the crystal regions contains vanadium, oxygen and the elements of the glass forming inorganic sulfide compound. Thus, in FIG. 6, the EDX profile of the amorphous area of a $V_2O_5/P_2S_5$ mechanically milled composite (area 1 of FIG. 5) shows the presence of phosphorous and sulfur in addition to V and O.

The inventors have surprisingly discovered that the amorphous vanadium oxide materials according to the various embodiments of the present invention as described herein may provide a cathode active material capable of a 3V class redox reaction. In preferred embodiments the vanadium oxide or vanadium oxide source is vanadium pentoxide ($V_2O_5$). In the description of the present invention the terms vanadium oxide and vanadium pentoxide may be used interchangeable, unless otherwise specified. Without being constrained by theory, it is believed that the amorphous structure of the composite matrix contained in each of the embodiments provides many defects and distorted spaces for acceptance of metal ions as described above and especially Mg ions. Further, the presence of the S atoms in the matrix "shields" magnesium ions from the strong attractive forces of the O atoms and allows for enhanced diffusion into and out of the matrix. In addition each of the active material composites benefits from the capability of the V to function as a redox element by the multiple redox reactions described above. Although not wishing to be limited by theory, the inventors believe the amorphous vanadium oxysulfide region accounts for the electrochemical activity of the active material of the present invention.

Amorphorization of the $V_2O_5$ according to the various embodiments may be conducted employing quenching and mechanical milling methods which are conventionally known. Applicants have discovered that by adding inorganic sulfide compounds as glass forming agents containing at least one of $P_2S_5$, $B_2S_3$, $SiS_2$, $GeS_2$, $Al_2S_3$ and $Ga_2S_3$ to the $V_2O_5$ during the preparation and by careful monitoring of the formation conditions, a substantially amorphous material or a material containing composite nanoparticles having small regions of crystallinity embedded in an amorphous matrix may be obtained. The degree of crystallinity may be determined by control of actual conditions of time, temperature, composition content, quench method and/or mechanical milling media employed in the amorphorization method.

In addition, the relative mol % content of $V_2O_5$ in the composite material affects the performance of a magnesium cell containing the material as a cathode active ingredient. With a content of about 35% to about 95% on a mol % basis, greater reversible redox activity may be obtained. Preferably, the content of $V_2O_5$ may be from 60 to 90 mol % and most preferably 67 to 90 mol %. The inventors have determined however, that the most preferred content varies according to the actual components of the composition and the method employed to obtain the composite material. Such preferred embodiments may be determined by experimental methods conventionally known to persons of ordinary skill in the art.

The inorganic sulfide compound or source of inorganic compound may preferably be selected from the group consisting of $P_2S_5$, $B_2S_3$, $SiS_2$, $GeS_2$, $Al_2S_3$ and $Ga_2S_3$. In one highly preferred embodiment $P_2S_5$ is used as the inorganic sulfide compound. Mixtures of these compounds may also be employed. In theory any inorganic sulfide compound that forms a glassy composite with $V_2O_5$ may be employed.

According to the present invention, the description "substantially amorphous" means that the material when analyzed by XRD does not show any crystalline peaks.

Thus in one embodiment commercially available $V_2O_5$ having a minimum purity of 98%, preferably, a minimum purity of 99% and most preferably, a minimum purity of 99.5% may be physically mixed with an inorganic sulfide compound in a selected mole % ratio. The physical mixture may then be co-comminuted in any conventional milling apparatus such as a ball mill until an XRD spectrum of the milled composite mixture is devoid of peaks associated with a crystalline material or until composite nanoparticles as shown in FIG. 5 are obtained. The term amorphous vanadium oxide-inorganic sulfide compound composite may be used to represent the various embodiments of the active material described according to the present invention.

In another embodiment, the physical mixture of the $V_2O_5$ and inorganic sulfide compound may be heated in an appropriate furnace or oven and quenched by dropping into water or by pressing between two plates or rollers. The amorphous solid solution obtained may then be pulverized. Although the grain size of the pulverant material is not limited, in a preferred embodiment, the grain size is 10 µm or less, more preferably 5 µm or less and most preferably 1 µm or less.

To prepare a cathode the amorphous $V_2O_5$-inorganic sulfide compound composite according to any of the embodiments of the present invention may be mixed with a binder. The binder material is not particularly limited and any binder recognized by one of skill in the art as suitable may be employed. Suitable binders may include polyvinylidene fluoride (PVDF), polytetrafluoroethylene (PTFE), styrene butadiene rubber (SBR), and polyimide. Polyvinylidene fluoride may be employed in one preferred embodiment.

In an embodiment of the invention the amorphous $V_2O_5$-inorganic sulfide compound composite may be mixed with a carbonaceous material such as graphite, carbon nanotubes or carbon black.

The amount of binder and carbonaceous material in the cathode composition may be no greater than 50% by weight, preferably no greater than 30% by weight and more preferably, no greater than 10% by weight.

The cathode according to the present invention may be employed in any of a lithium battery, sodium battery or magnesium battery. In a preferred embodiment, a reversible magnesium battery having the cathode containing the amorphous vanadium oxide-inorganic sulfide compound composite is provided.

The anode of the magnesium battery may be any anode suitable for a magnesium battery, including an anode of magnesium metal or a composition containing magnesium metal, such as $Mg_3Bi_2$. The anode active material may further include an electrically conductive material and a binder. Examples of electrically conducting materials include carbon particles, such as carbon black. Example binders include various polymers, such as PVDF, PTFE, SBR, and polyimide.

An electrolyte layer may be disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include phenyl magnesium chloride (Ph-$MgCl^+$) with aluminum trichloride ($AlCl_3^-$) in tetrahydrofuran (THF), magnesium monocarbonane [$Mg(CB_{11}H_{12})_2$] in tetraglyme (TEGDME) or magnesium perchlorate [$Mg(ClO_4)_2$] in acetonitrile (ACN). In a preferred embodiment, the electrolyte may be $Mg(ClO_4)_2$ in ACN.

The cathode active material may be present as a sheet, ribbon, particles, or other physical form. An electrode containing the cathode active material may be supported by a current collector.

A current collector may include a metal or other electrically conducting sheet on which the electrode is supported. The current collector may be formed of carbon, carbon paper, carbon cloth or a metal or noble metal mesh or foil.

Figure 1:
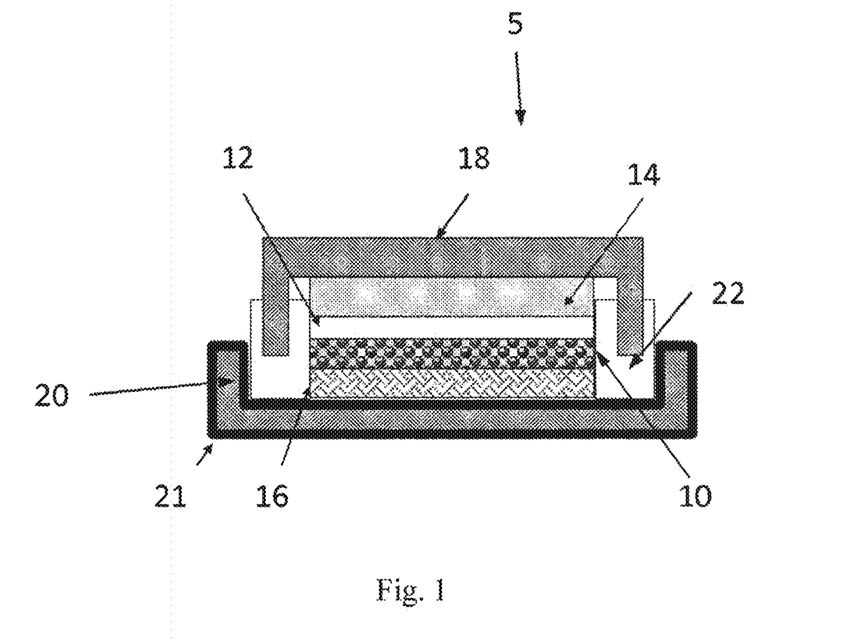
FIG. 1 shows a schematic diagram of a magnesium battery according to one embodiment of the present invention.

FIG. 1 shows an example of one configuration of a rechargeable magnesium cell 5. The cell 5 includes a positive electrode 10 including the amorphous $V_2O_5$-inomanic sulfide compound composite according to the invention as the cathode active material, an electrolyte layer 12, a negative electrode 14, a cathode current collector 16, a negative electrode housing 18, a positive electrode housing 20 including an inert layer 21, and a sealing gasket 22. The electrolyte layer 12 may include a separator soaked in electrolyte solution, and the positive electrode 10 may be supported by the cathode current collector 16. In this example, the negative electrode 14 includes an active material of magnesium metal.

Figure 2:
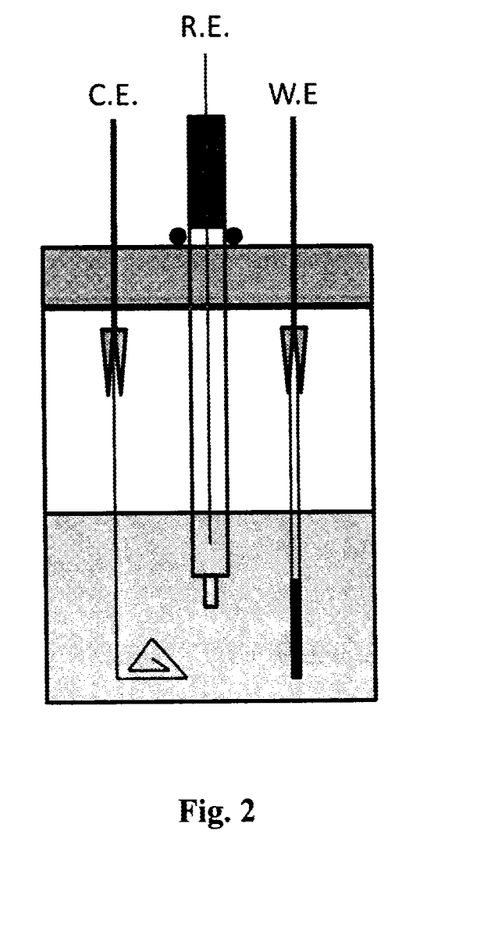
FIG. 2 shows a schematic electrochemical test cell according to one embodiment of the present invention.

FIG. 2 shows a schematic diagram of a three electrode cell which may be useful for evaluation and characterization of the cathode active materials of the present invention. In FIG. 2 the cell is constructed with a glass vial having a silicone cap. The reference electrode (R.E.) is a $Ag/Ag^+$ electrode consisting of a Ag wire in a reference solution of 0.01 M $AgNO_3$ and 0.1 M tetrabutylammonium perchlorate (TBAP) in acetonitrile (ACN). The working electrode (W.E.) is constructed of an 80 mesh stainless steel screen upon which a layer of the active material to be tested is formed. The anode (C.E.) is constructed of a magnesium foil. The electrolyte is a 1 M $Mg(ClO_4)_2$ in ACN. A test cell as shown schematically in FIG. 2 may be useful to conduct cyclic voltammetry, impedance and charge/discharge testing. Such testing may be conducted in an argon atmosphere by placing the test cell in a glove box.

Having generally described this invention, a further understanding can be obtained by reference to certain specific examples which are provided herein for purposes of illustration only and are not intended to be limiting unless otherwise specified.

EXAMPLES

The invented materials were prepared by ball milling of the starting materials ($V_2O_5$ and $P_2S_5$) under a rotation speed of 370 rpm for 20 h in Ar atmosphere. The $ZrO_2$ balls and pot were used for ball milling synthesis. After ball milling, the samples were collected under Ar atmosphere. The invented sample was mixed with Acetylene black (Denkikagaku Kogyo, HS-100) and PVDF (Kureha, KF9305) in N-methylpyrrolidone (NMP) solution to prepare a homogeneous cathode ink. The obtained ink was cast on an 80 mesh stainless steel and then dried at 120° C. under vacuum.

Figure 3:
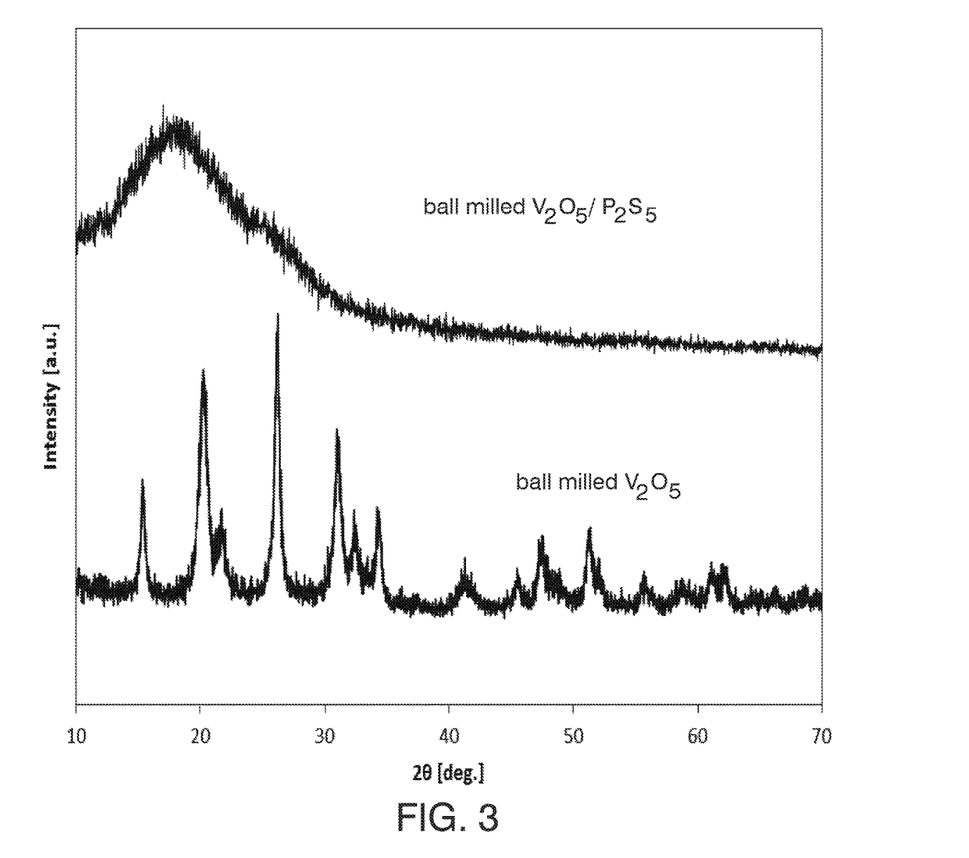
FIG. 3 shows a XRD pattern of a $V_2O_5$—$P_2S_5$ composite according to one embodiment of the present invention.

FIG. 3 shows the XRD pattern of $V_2O_5$—$P_2S_5$ material prepared in the ball milling process. No crystalline peak was observed by XRD, which means that the obtained material became amorphous.

Figure 4:
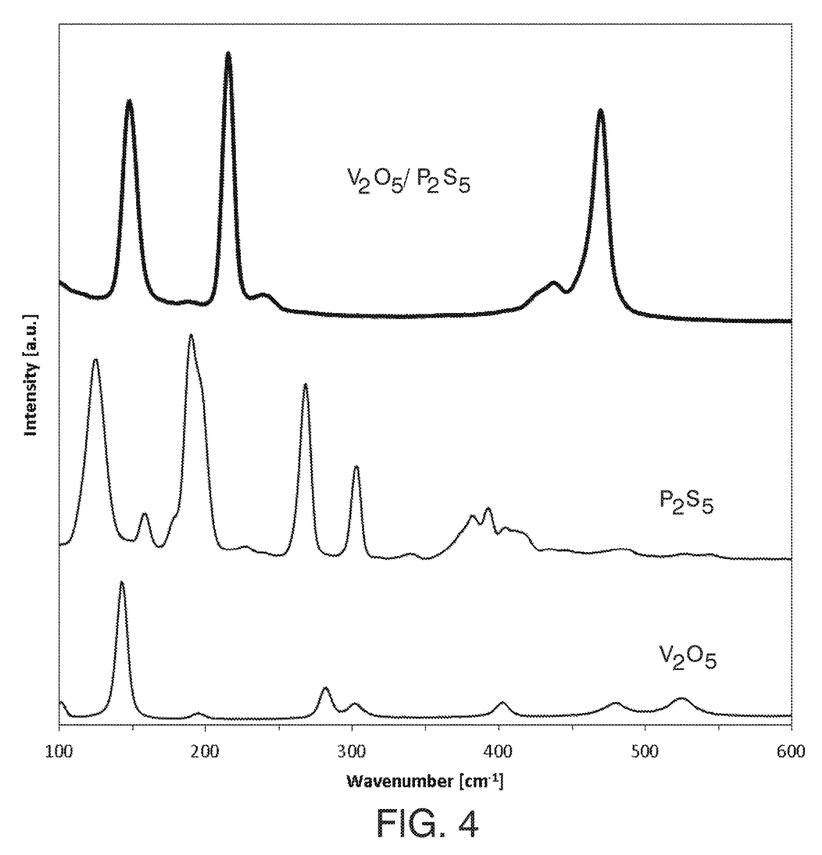
FIG. 4 shows Raman spectra of a $V_2O_5$—$P_2S_5$ composite according to one embodiment of the present invention in comparison to $V_2O_5$ and to $P_2S_5$.

FIG. 4 shows the Raman spectra of $V_2O_5$—$P_2S_5$ material in comparison with $P_2S_5$ and $V_2O_5$. The addition of $P_2S_5$ provides a different chemical environment from $V_2O_5$ and $P_2S_5$. Also, the characteristic peak for S inclusion was observed at around 400-500 $cm^{-1}$.

Figure 6:
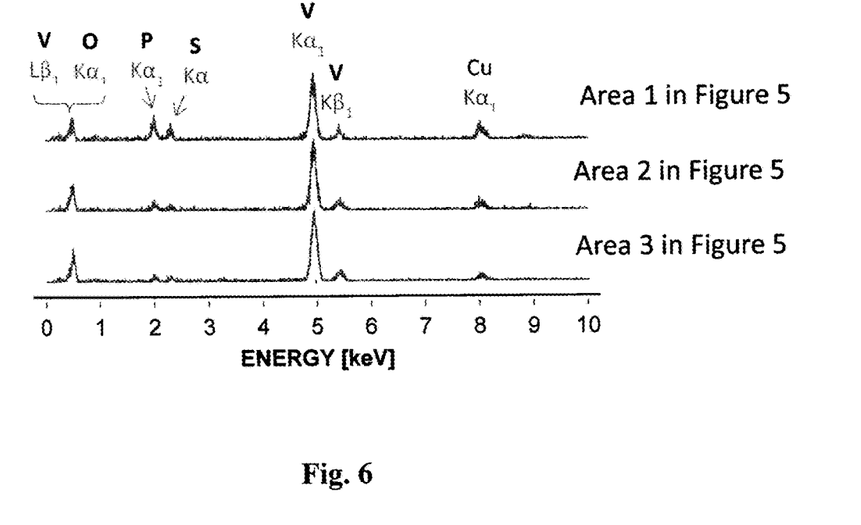
FIG. 6 shows energy dispersive X-ray spectroscopy (EDX) profiles of selected areas 1, 2 and 3 of the nanoparticle shown in FIG. 5.

FIG. 5 shows a TEM image of a $V_2O_5$—$P_2S_5$ ball-milled sample showing a nanoparticle as a composite of an amorphous matrix with embedded crystalline regions. Area 1 represents a typical amorphous morphology which was observed as the occupying the major portion of the nanoparticle volume in this sample. Areas 2 & 3 show regions of $V_2O_5$ crystals embedded in the amorphous matrix. EDX profiles of the selected areas of the $V_2O_5$—$P_2S_5$ sample in FIG. 5 are shown in FIG. 6. In the amorphous sample, the elements of V, O, P and S were clearly detected, while only the elements of V and O were observed in the crystals.

Figure 7:
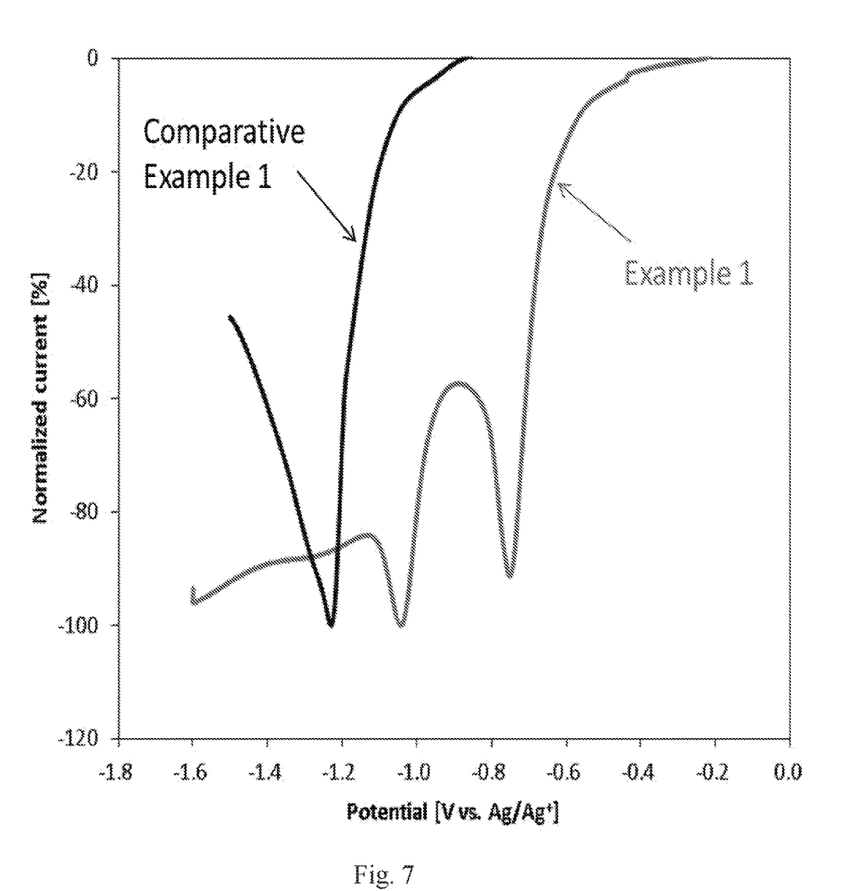
FIG. 7 shows an initial linear sweep of voltammogram of a $V_2O_5$—$P_2S_5$ composite prepared in Example 1 in comparison with the state-of-the-art $Mo_6S_8$.

FIG. 7 shows the initial linear sweep voltammograms of $V_2O_5$—$P_2S_5$ material in comparison with the state-of-the-art Chevrel $Mo_6S_8$ material in the conventional based electrolytes (1M $Mg(ClO_4)_2$ in ACN). Scan rate was 0.1 mV/sec and the operation temperature was 25° C. The current was cathodically swept and was normalized by the maximum current observed in each voltammogram. The potential was normalized by the Ag reference electrode. The observed working potential of the $V_2O_5$-inorganic sulfide compound composite was higher than that of the Chevrel phase (comparative example 1). Also, according to our experiments, comparable discharge capacity was obtained in different Mg battery electrolytes. It is also noted that 0V vs. $Ag/Ag^+$ in potential corresponded to approximately 2.5 V vs. $Mg/Mg^{2+}$.

Figure 8:
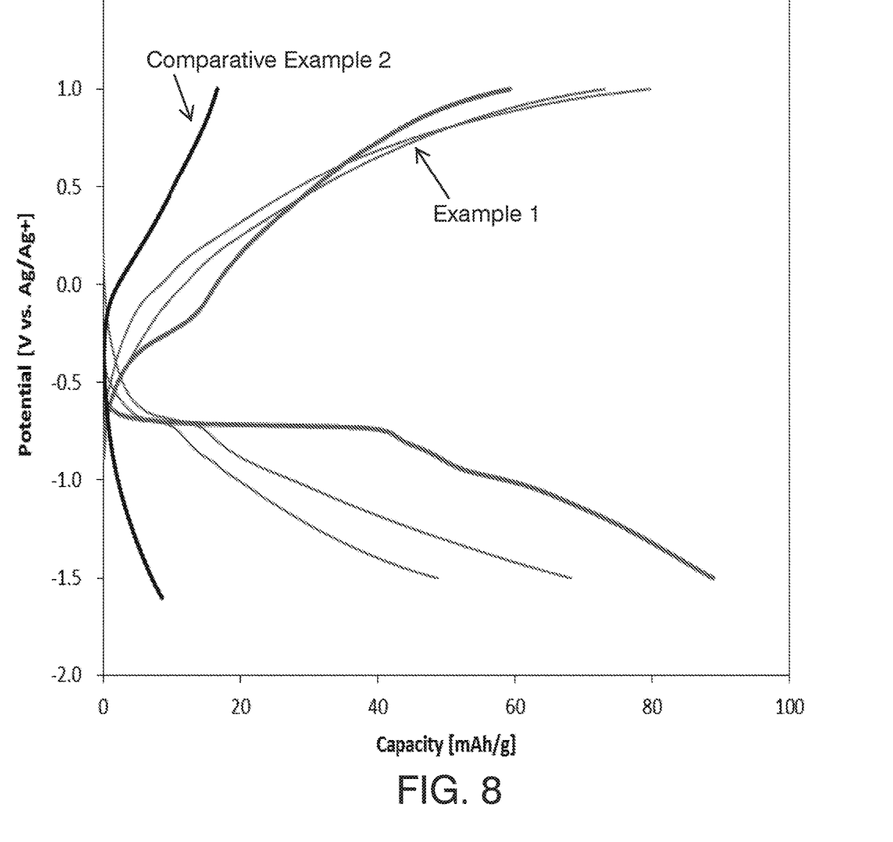
FIG. 8 shows the first three cycles of a working electrode prepared with an active composite nanoparticle material according to the present invention as active material in comparison to an active material composed of ball-milled $V_2O_5$.

FIG. 8 shows the first three cycles of nanoparticle composite $V_2O_5$—$P_2S_5$ sample as a working electrode in the three electrode cell set-up shown in FIG. 2. The initial cycle of the ball milled $V_2O_5$ sample (comparative example 2) is shown for comparison. The current density was 0.1 $mA/cm^2$ and the operation temperature was 25° C. The potential was normalized by the Ag reference electrode. It was obvious that the observed capacity of the $V_2O_5$—$P_2S_5$ sample was higher than that of the $V_2O_5$ sample. Although capacity fading was observed mainly due to a side reaction from the anode side, the cell was repeatedly cycled.

In conclusion, the synthesized amorphous vanadium oxide-inorganic sulfide compound according to the embodiments of the present invention showed significantly improved electrochemical properties than the benchmarked Chevrel $Mo_6S_8$ material and referenced $V_2O_5$ material, suggesting higher energy density may be obtained according to the embodiments of the invention in comparison to known state-of-the-art cathode materials.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A cathode active material, comprising:
    a composite of vanadium oxide and an inorganic sulfide compound;
    wherein the structure of the composite is substantially amorphous and an XRD analysis does not show a crystalline peak.

2. The cathode active material of claim 1, wherein the inorganic sulfide compound is at least one selected from the group consisting of $P_2S_5$, $B_2S_3$, $GeS_2$, $Al_7S_3$ and $Ga_2S_3$.

3. A cathode, comprising:
    a current collector; and
    the cathode active material of claim 1.

4. An electrochemical cell comprising:
    an anode;
    the cathode of claim 3; and
    an electrolyte;
    wherein the anode and cathode are capable of absorbing and releasing a metal ion selected from the group consisting of a lithium ion, a sodium ion and a magnesium ion.

5. A magnesium battery comprising the electrochemical cell of claim 4; wherein the anode and cathode are capable of absorbing and releasing a magnesium ion.

* * * * *